United States Patent
Huo et al.

(10) Patent No.: US 10,921,661 B2
(45) Date of Patent: Feb. 16, 2021

(54) COLOR FILTER SUBSTRATE AND METHOD OF MANUFACTURING THE SAME, AND DISPLAY PANEL

(71) Applicants: BOE Technology Group Co., Ltd., Beijing (CN); Ordos Yuansheng Optoelectronics Co., Ltd., Ordos (CN)

(72) Inventors: Peirong Huo, Beijing (CN); Yezhou Fang, Beijing (CN); Shicheng Sun, Beijing (CN); Jingyi Xu, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 636 days.

(21) Appl. No.: 15/789,522

(22) Filed: Oct. 20, 2017

(65) Prior Publication Data

US 2018/0275469 A1    Sep. 27, 2018

(30) Foreign Application Priority Data

Mar. 23, 2017   (CN) .......................... 201710178360.4

(51) Int. Cl.
   *G02F 1/1362*   (2006.01)
   *G02F 1/1335*   (2006.01)

(52) U.S. Cl.
   CPC .. *G02F 1/136204* (2013.01); *G02F 1/133512* (2013.01); *G02F 1/133514* (2013.01);
   (Continued)

(58) Field of Classification Search
   CPC ......... G02F 1/133512; G02F 1/136286; G02F 1/136204; G02F 1/133514; G02F 1/133516; G02F 2202/22; G02F 2202/16
   See application file for complete search history.

(56) References Cited

U.S. PATENT DOCUMENTS 4,289,384 A * 9/1981 Samek .................. G02F 1/0551
                                           174/261
6,350,674 B1 * 2/2002 Okamura ............ H01L 21/0274
                                          257/E21.027
(Continued)

FOREIGN PATENT DOCUMENTS

CN       105138188 A    12/2015
CN       105807482 A     7/2016
(Continued)

OTHER PUBLICATIONS

First Office Action, including Search Report, for Chinese Patent Application No. 201710178360.4, dated Mar. 1, 2019, 16 pages.

*Primary Examiner* — Hoan C Nguyen

(74) *Attorney, Agent, or Firm* — Westman, Champlin & Koehler, P.A.

(57) ABSTRACT

Embodiments of the present disclosure provide a color filter substrate and a method of manufacturing the same, and a display panel. The color filter substrate includes a base substrate and a light shielding pattern on the base substrate. The light shielding pattern is provided with a groove, which divides the light shielding pattern into an outer light shielding sub-pattern corresponding to a peripheral region of the color filter substrate and an inner light shielding sub-pattern arranged at a position corresponding to a display area of the color filter substrate; an electrically conductive pattern is provided in at least part of a region in the groove and electrically connected with the inner light shielding sub-pattern and/or the outer light shielding sub-pattern.

19 Claims, 4 Drawing Sheets

(52) U.S. Cl.
CPC .. *G02F 1/136286* (2013.01); *G02F 1/133516* (2013.01); *G02F 2202/16* (2013.01); *G02F 2202/22* (2013.01)

(56) References Cited

U.S. PATENT DOCUMENTS

| | | | |
|---|---|---|---|
| 7,571,529 B2* | 8/2009 | Sirringhaus | B82Y 30/00 29/417 |
| 2002/0115292 A1* | 8/2002 | Andricacos | H01L 21/76886 438/687 |
| 2003/0186537 A1* | 10/2003 | Yamanaka | H01L 21/76808 438/637 |
| 2004/0203226 A1* | 10/2004 | Sakata | H01L 21/76829 438/637 |
| 2010/0132176 A1* | 6/2010 | Lee | B41J 2/1646 29/25.35 |
| 2013/0088672 A1* | 4/2013 | Shin | G02F 1/1345 349/110 |
| 2018/0107052 A1* | 4/2018 | Jiang | G02F 1/133514 |
| 2018/0107337 A1* | 4/2018 | Sun | G02F 1/133512 |
| 2018/0246369 A1* | 8/2018 | Huang | H01L 23/60 |

FOREIGN PATENT DOCUMENTS

| | | | | |
|---|---|---|---|---|
| CN | 106054444 A | | 10/2016 | |
| CN | 205862051 U | | 1/2017 | |
| JP | 11224880 A | * | 8/1999 | ....... H01L 21/76817 |
| JP | 2010107945 A | * | 5/2010 | |
| KR | 10-2015-0033158 A | | 4/2015 | |

\* cited by examiner

COLOR FILTER SUBSTRATE AND METHOD OF MANUFACTURING THE SAME, AND DISPLAY PANEL

CROSS-REFERENCE TO RELATED APPLICATION

This application claims the benefit of the Chinese Patent Application No. 201710178360.4 entitled "Color Filter Substrate and Method of Manufacturing The Same, and Display Panel" and filed on Mar. 23, 2017, the whole disclosure of which is incorporated herein by reference.

BACKGROUND OF THE DISCLOSURE

Field of the Disclosure

The present disclosure relates to the field of display technologies, and particularly to a color filter substrate and a method of manufacturing the same, and a display panel.

Description of the Related Art

LCD (Liquid Crystal Display) comprises an array substrate and a color filter substrate assembled into a cell, and liquid crystal located between the array substrate and the color filter substrate, and may achieve gray scale display by controlling deflection angle of the liquid crystal.

SUMMARY

Embodiments of the present disclosure provide a color filter substrate and a method of manufacturing the same, and a display panel.

In one aspect, there is provided a color filter substrate, comprising:

a base substrate; and a light shielding pattern on the base substrate, the light shielding pattern being provided with a groove, which divides the light shielding pattern into an outer light shielding sub-pattern corresponding to a peripheral region of the color filter substrate and an inner light shielding sub-pattern arranged at a position corresponding to a display area of the color filter substrate;

wherein an electrically conductive pattern is provided in at least part of a region in the groove and electrically connected with the inner light shielding sub-pattern and/or the outer light shielding sub-pattern.

In one example, the electrically conductive pattern has an electrical resistivity less than an electrical resistivity of the light shielding pattern.

In one example, the electrically conductive pattern is provided for being grounded.

In one example, the electrically conductive pattern is filled into the whole groove.

In one example, a side of the color filter substrate corresponding to a step region of a display panel is a first side, and the groove is in communication with the first side of the color filter substrate.

In one example, at least one end of the electrically conductive pattern extends to the first side of the color filter substrate.

In one example, after an array substrate and the color filter substrate are assembled into a cell, a portion of the electrically conductive pattern extending to the first side is electrically connected with a ground wiring on the array substrate by an electrically conductive adhesive.

In one example, the groove has a U shape or square shape.

In one example, a depth of the groove is equal to a thickness of the light shielding pattern.

In one example, a width of the groove is in a range from 20 um to 50 um.

In one example, a material of the light shielding pattern is a resin material.

In one example, a material of the electrically conductive pattern is a metal material.

In another aspect, there is provided a display panel, comprising an array substrate and the above color filter substrate arranged opposite to each other.

In one example, the electrically conductive pattern has an electrical resistivity less than an electrical resistivity of the light shielding pattern and the electrically conductive pattern is provided for being grounded.

In one example, the groove has a U shape or square shape and the electrically conductive pattern is filled into the whole groove.

In one example, a side of the color filter substrate corresponding to a step region of the display panel is a first side, and the groove is in communication with the first side of the color filter substrate;

at least one end of the electrically conductive pattern extends to the first side of the color filter substrate; and after an array substrate and the color filter substrate are assembled into a cell, a portion of the electrically conductive pattern extending to the first side is electrically connected with a ground wiring on the array substrate by an electrically conductive adhesive.

In one example, a depth of the groove is equal to a thickness of the light shielding pattern, and a width of the groove is in a range from 20 um to 50 um.

In one example, a material of the light shielding pattern is a resin material, and a material of the electrically conductive pattern is a metal material.

In a further aspect, there is provided a method of manufacturing a color filter substrate, comprising:

forming a light shielding pattern on a base substrate, the light shielding pattern being provided with a groove, which divides the light shielding pattern into an outer light shielding sub-pattern corresponding to a peripheral region of the color filter substrate and an inner light shielding sub-pattern arranged at a position corresponding to a display area of the color filter substrate; and providing an electrically conductive pattern in at least part of a region in the groove, the electrically conductive pattern being electrically connected with the inner light shielding sub-pattern and/or the outer light shielding sub-pattern.

In one example, the forming the light shielding pattern on the base substrate comprises:

forming a layer of light shielding material film on the base substrate; and performing exposure and development processes on the layer of light shielding material film by using a preset mask, so as to obtain the outer light shielding sub-pattern, the inner light shielding sub-pattern, and the groove between the outer light shielding sub-pattern and the inner light shielding sub-pattern.

In one example, the providing the electrically conductive pattern in at least part of the region in the groove comprises:

forming an electrically conductive film on the light shielding pattern and in the groove;

forming a preset photoresist over the electrically conductive film, one of the preset photoresist and the layer of light shielding material film is positive photoresist and the other is negative photoresist;

performing exposure and development processes on the preset photoresist by using the preset mask, such that a portion of the preset photoresist corresponding to the groove is fully remained; and etching the electrically conductive film to obtain the electrically conductive pattern.

DETAILED DESCRIPTION OF PREFERRED EMBODIMENTS OF THE DISCLOSURE

In order to provide better understanding of technique schemes of the present disclosure to those skilled in the art, a color filter substrate and a method of manufacturing the same, and a display panel according to embodiments of the present disclosure will be described hereinafter in detail with reference to the drawings.

During manufacturing and using a liquid crystal display, electrostatic charges are easily generated and accumulated on the color filter substrate. An electrostatic field will be generated when the electrostatic charges are accumulated to a certain degree and will easily cause liquid crystal molecules filled between the color filter substrate and an array substrate to be deflected, which will result in abnormity in display picture, thus it is very important for the liquid crystal display to remove electrostatic charges.

Figure 1:
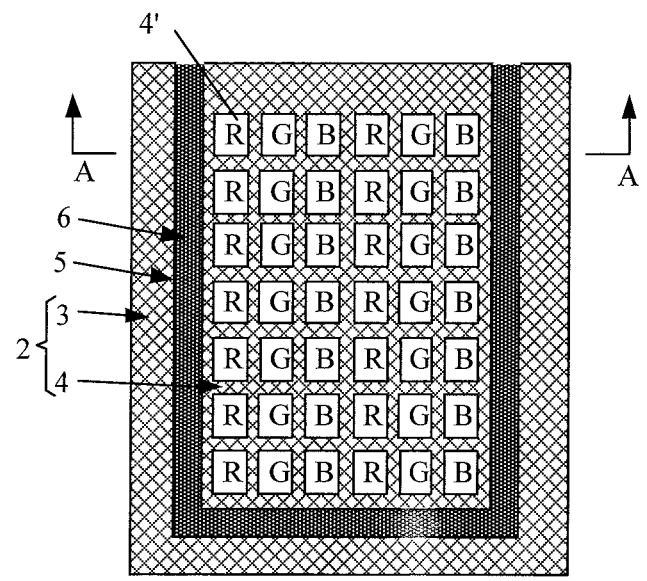
FIG. 1 is a top view of a color filter substrate according to an embodiment of the present disclosure.
Figure 2:
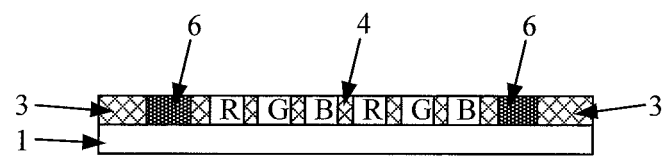
FIG. 2 is sectional schematic diagram taken along line A-A shown in FIG. 1.

FIG. 1 is a top view of a color filter substrate according to an embodiment of the present disclosure, and FIG. 2 is sectional schematic diagram taken along line A-A shown in FIG. 1. As shown FIG. 1 and FIG. 2, the color filter substrate comprises: a base substrate 1 and a light shielding pattern 2 on the base substrate 1, the light shielding pattern 2 is provided therein with a groove 5, which divides the light shielding pattern 2 into an outer light shielding sub-pattern 3 and an inner light shielding sub-pattern 4. The outer light shielding sub-pattern 3 is arranged at a position corresponding to a peripheral region of the color filter substrate, and the inner light shielding sub-pattern 4 is arranged at a position corresponding to a display area of the color filter substrate. An electrically conductive pattern 6 is provided in at least part of a region in the groove 5 and electrically connected with at least one of the outer light shielding sub-pattern 3 and the inner light shielding sub-pattern 4.

In one example, the electrically conductive pattern 6 has an electrical resistivity less than an electrical resistivity of the light shielding pattern 2, and/or the electrically conductive pattern 6 is provided for being grounded. It may be understood that the electrically conductive pattern 6 may conduct out electrostatic charges on at least one of the outer light shielding sub-pattern 3 and the inner light shielding sub-pattern 4 in any other known manner, and is not necessarily provided for being grounded, for example, this function may be achieved by electrically connecting the electrically conductive pattern with other metal component(s). Here, the electrically conductive pattern 6 being grounded is taken as an example for illustrating operation principle thereof.

It is noted that it is well known by those skilled in the art that the color filter substrate comprises a display area for pixel display and a peripheral region around the display area.

Generally, a side of the light shielding pattern 2 is grounded in order to avoid more electrostatic charges from being accumulated on the light shielding pattern 2. In practice, however, the light shielding pattern 2 has a larger electrical resistivity (generally, 10 to 12 $\Omega\cdot cm$) and a poor conductive performance, charges accumulated on a portion of the light shielding pattern 2 located within the display area cannot be conducted out from the side of the light shielding pattern 2, thus more electrostatic charges will be accumulated on the portion of the light shielding pattern 2 located within the display area.

In this embodiment, in order to solve the problem that more electrostatic charges are accumulated on the portion of the light shielding pattern 2 located within the display area, two means i.e., "unclogging" and "blocking" are adopted. They are listed below particularly:

In this embodiment, the groove 5 is provided and the electrically conductive pattern 6 having a smaller resistivity is disposed in the groove 5 and provided for being grounded, such that when the electrically conductive pattern 6 is electrically connected with the inner light shielding sub-pattern 4 located in the display area, the inner light shielding sub-pattern 4 may be electrically connected with the ground, that is, a passage between the inner light shielding sub-pattern 4 and the ground is "unclogged" to facilitate conducting electrostatic charges away from the inner light shielding sub-pattern, thereby avoiding the problem that more electrostatic charges are accumulated on the inner light shielding sub-pattern 4;

when the electrically conductive pattern 6 is electrically connected with the outer light shielding sub-pattern 3 located in a non-display area, the outer light shielding sub-pattern 3 may be electrically connected with the ground, such that during movement of electrostatic charges towards the inner light shielding sub-pattern 4 from the outer light shielding sub-pattern 3, the electrostatic charges will be conducted out by the electrically conductive pattern 6 electrically connected with the inner light shielding sub-pattern 4 and cannot move to the inner light shielding sub-pattern 4, that is, a movement path of the electrostatic charges towards the inner light shielding sub-pattern 4 is "blocked", thereby avoiding the problem that more electrostatic charges are accumulated on the inner light shielding sub-pattern.

Optionally, a depth of the groove 5 is equal to a thickness of the light shielding pattern, that is, the groove penetrates through the whole light shielding pattern.

In one example, as shown FIG. 1 and FIG. 2, the electrically conductive pattern 6 is filled into the whole groove 5, and at this time, the electrically conductive pattern 6 is electrically connected with both the outer light shielding sub-pattern 3 and the inner light shielding sub-pattern 4, so that the electrically conductive pattern 6 not only functions for "both blocking and unclogging" but also can effectively avoid problem of light leakage from the groove 5.

Optionally, the light shielding pattern 2 is made of a resin material, and the electrically conductive pattern 6 is made of a metal material. A width of the groove 5 is in a range from 20 um to 50 um, and a width of the outer light shielding sub-pattern 3 is in a range from 100 um to 200 um.

As can be seen from the above, the electrically conductive pattern 6 can effectively solve the problem that more electrostatic charges are accumulated on the portion of the light shielding pattern 2 located within the display area regardless of being electrically connected with the inner light shielding sub-pattern 4 or being electrically connected with the outer light shielding sub-pattern 3. It is noted that in this embodiment, the implementation where the electrically conductive pattern 6 is electrically connected with both the outer light shielding sub-pattern 3 and the inner light shielding sub-pattern 4, is only one exemplary implementation of the present disclosure and can function for "both blocking and unclogging" electrostatic charges, and it should not be understood as being limitative to technique schemes of the present disclosure. It is known for those skilled in the art that the case, in which the electrically conductive pattern 6 is only electrically connected with one of the outer light shielding sub-pattern 3 and the inner light shielding sub-pattern 4 in order to solve the problem of more electrostatic charges being accumulated on the inner light shielding sub-pattern, also shall fall within scopes of the present disclosure, and its specifics will not be described in detail herein for sake of brevity.

Optionally, the color filter substrate further comprises color resists R/G/B, the inner light shielding sub-pattern 4 is provided therein with several grooves 4' corresponding to the color resists R/G/B in a one-to-one corresponding relation, and the color resists R/G/B are located within corresponding grooves 4', for providing color display. It is noted that in the figures, the case in which the color resists include three color resists R, G and B is only exemplary and should not be understood as being limitative to technique schemes of the present disclosure.

Figure 3:
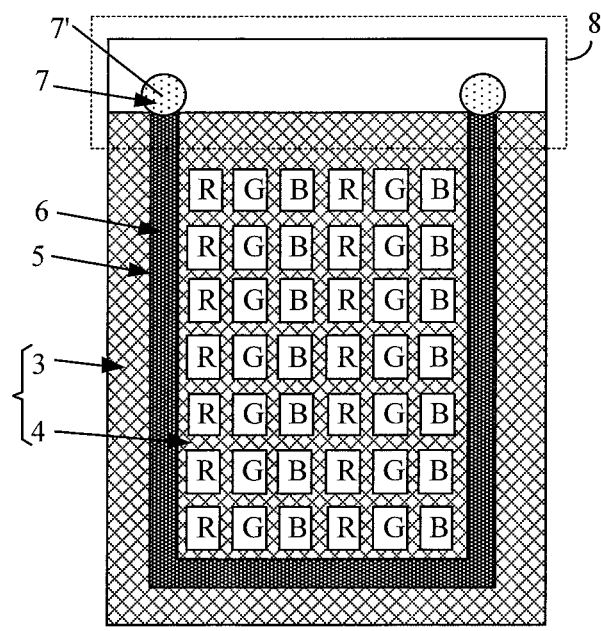
FIG. 3 is a schematic diagram of a color filter substrate and an array substrate shown in FIG. 1 in an assembled state.

FIG. 3 is a schematic diagram of a color filter substrate and an array substrate shown in FIG. 1 in an assembled state. As shown FIG. 3, optionally, a side of the color filter substrate corresponding to a step region 8 (a side of an array substrate extending beyond the color filter substrate and a corresponding side of the color filter substrate form the step region 8, and structures such as a driver chip, a signal wiring, a ground wiring and the like are provided in a region of the array substrate corresponding to the step region 8) of the display panel is a first side, the groove 5 is in communication with the first side of the color filter substrate, at least one end of the electrically conductive pattern 6 extends to the first side of the color filter substrate, and after the array substrate and the color filter substrate are assembled into a cell, a portion of the electrically conductive pattern 6 extending to the first side is electrically connected with a ground wiring 7' on the array substrate by an electrically conductive adhesive 7 (for example, conductive silver glue). In this embodiment, the portion of the electrically conductive pattern 6 extending to the first side is electrically connected with the ground wiring 7' on array substrate by the electrically conductive adhesive 7, enabling grounding of the electrically conductive pattern 6, thus no additional ground wiring needs to be provided on the color filter substrate, and the cost is effectively saved.

It is noted that in this embodiment, the implementation, in which at least one end of the electrically conductive pattern 6 extends to the side of the color filter substrate corresponding to the step region 8 and the electrically conductive pattern 6 is electrically connected with the ground wiring 7' on the array substrate by the electrically conductive adhesive 7 so as to enable grounding of the electrically conductive pattern 6, is only one exemplary implementation of the present disclosure and should not be understood as being limitative to technique schemes of the present disclosure. In this embodiment, the electrically conductive pattern 6 may be grounded in other ways, for example, a ground wiring 7' may be provided in the peripheral region of the color filter substrate.

Figure 4:
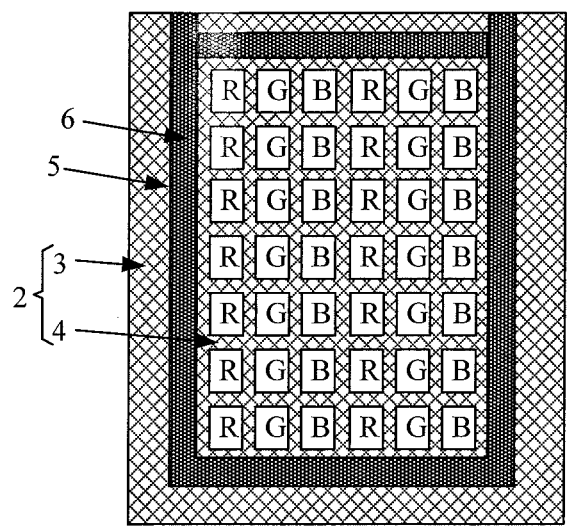
FIG. 4 is a top view of a color filter substrate according to another embodiment of the present disclosure.

FIG. 4 is a top view of a color filter substrate according to another embodiment of the present disclosure. The groove 5 in the FIG. 4 has a square shape, which is different from the U shaped groove 5 in FIG. 1. Of course, the groove 5 of the present disclosure may be designed into other shapes as required, which will not exemplified one by one.

Embodiments of the present disclosure provide a color filter substrate, in which the groove is provided in the light shielding pattern and the electrically conductive pattern is formed in the groove and electrically connected with the outer light shielding sub-pattern and/or the inner light shielding sub-pattern, thereby the problem that more electrostatic charges are accumulated on the portion of the light shielding pattern located within the display area that can be effectively solved.

An embodiment of the present disclosure further provides a display panel, comprising an array substrate and the color filter substrate arranged opposite to each other, the color filter substrate may be the color filter substrate described in any one of the above examples, and its detail description may refer to the above examples and will not be repeatedly described.

An embodiment of the present disclosure further provides a method of manufacturing a color filter substrate, which may manufacture the color filter substrate described in any one of the above examples or embodiments. The method provided according to this embodiment will be described in detail with reference to the drawings.

Figure 5:
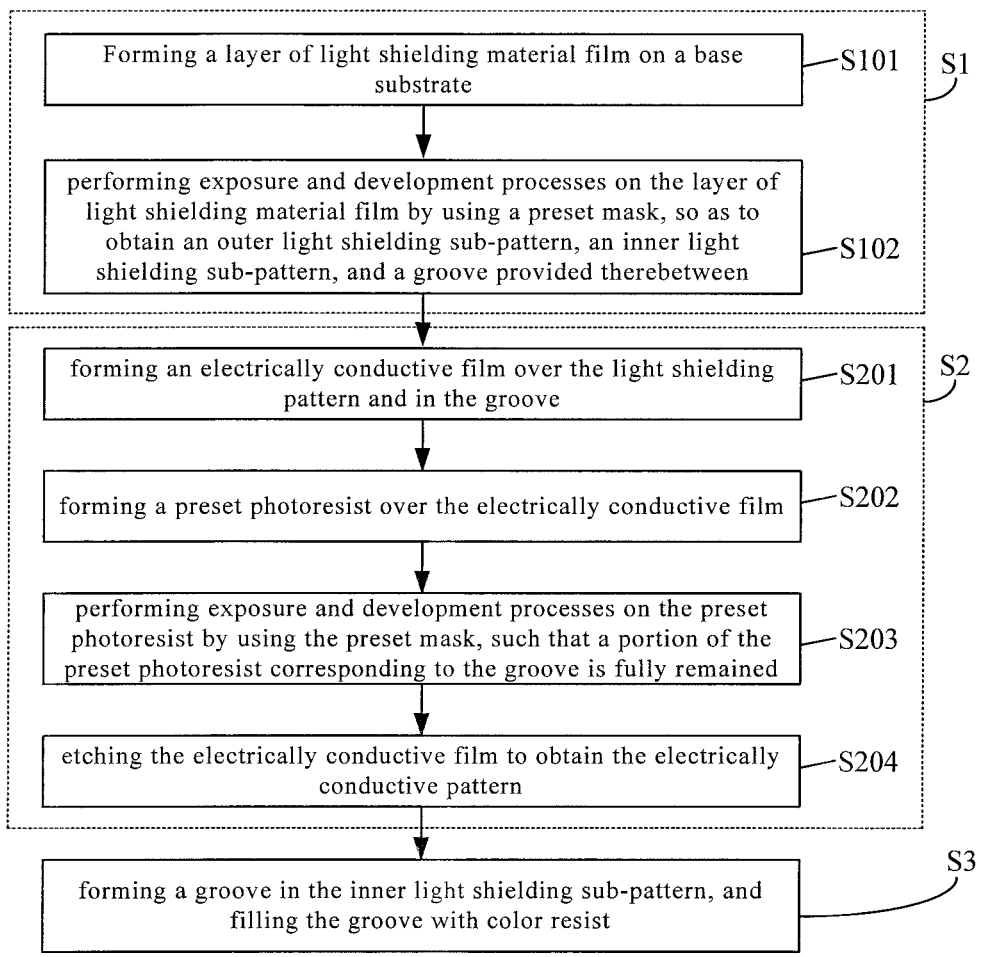
FIG. 5 is a flowchart of a method of manufacturing a color filter substrate according to a further embodiment of the present disclosure.
Figure 6:
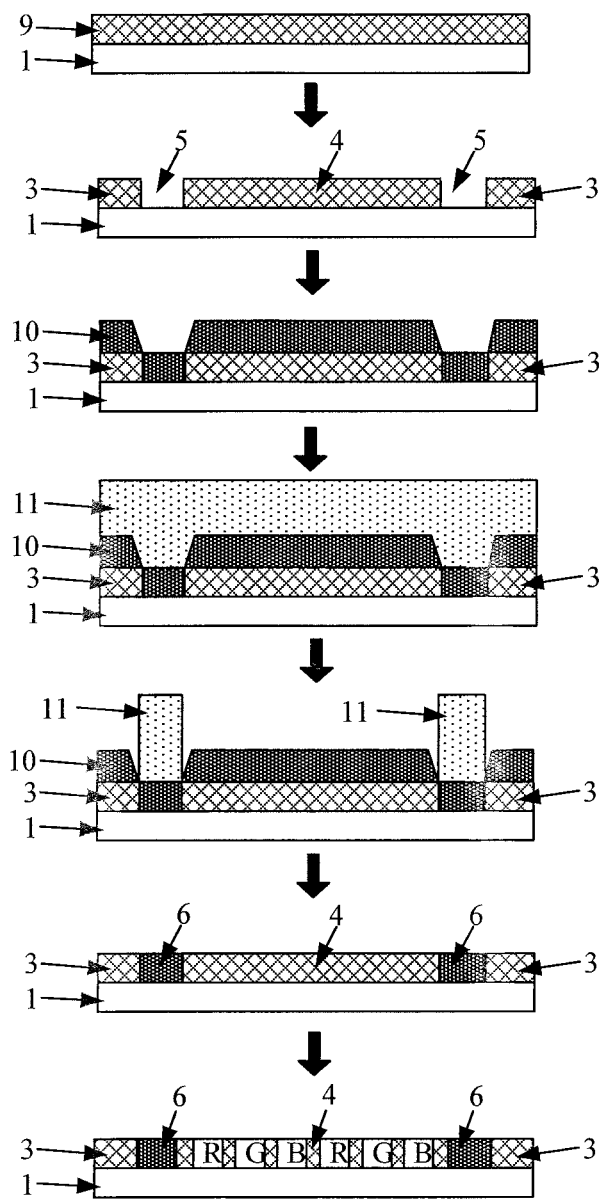
FIG. 6 is a structural schematic diagram of a color filter substrate manufactured by the method shown in FIG. 5.

FIG. 5 is a flowchart of a method of manufacturing a color filter substrate according to a further embodiment of the present disclosure, and FIG. 6 is a structural schematic diagram of a color filter substrate manufactured by the method shown in FIG. 5. As shown FIG. 5 and FIG. 6, the method of manufacturing a color filter substrate comprises:

step S1: forming a light shielding pattern on a base substrate, the light shielding pattern being provided with a groove, which divides the light shielding pattern into an outer light shielding sub-pattern corresponding to a peripheral region of the color filter substrate and an inner light shielding sub-pattern arranged at a position corresponding to a display area of the color filter substrate.

Optionally, the step S1 specifically comprises:

step S101: forming a layer of light shielding material film 9 on a base substrate 1.

In this embodiment, the layer of light shielding material film 9 is made of a resin material.

step S102: performing exposure and development processes on the layer of light shielding material film 9 by using a preset mask, so as to obtain an outer light shielding sub-pattern 3, an inner light shielding sub-pattern 4, and a groove 5 provided between the outer light shielding sub-pattern 3 and the inner light shielding sub-pattern 4.

step S2: providing an electrically conductive pattern 6 in at least part of a region in the groove 5, the electrically conductive pattern 6 having an electrical resistivity less than an electrical resistivity of the light shielding pattern 2, the electrically conductive pattern 6 being electrically connected with the inner light shielding sub-pattern 4 and/or the outer light shielding sub-pattern 3, the electrically conductive pattern 6 being grounded.

Optionally, the electrically conductive pattern 6 is filled into the whole groove 5, and in this case, the step S2 comprises:

step S201: forming an electrically conductive film 10 over the light shielding pattern 2 and the groove 5.

In an example, a material of the electrically conductive film 10 is a metal material.

step S202: forming a preset photoresist 11 over the electrically conductive film 10.

In an example, one of the preset photoresist 11 and the layer of light shielding material film 9 is positive photoresist and the other is negative photoresist.

In this embodiment, an example in which the preset photoresist 11 is negative photoresist and the layer of light shielding material film 9 is positive photoresist is described. The preset mask comprises a light transmission region and a light non-transmission region, such that during exposure of the layer of light shielding material film 9 in the above step S102, the light transmission region is aligned with the groove 5, and the light non-transmission region is aligned with the inner light shielding sub-pattern 4 and the outer light shielding sub-pattern 3; after being processed by a developer, a portion of the layer of light shielding material film 9 aligned with the groove 5 is fully removed, thereby obtaining the inner light shielding sub-pattern 4 and the outer light shielding sub-pattern 3.

step S203: performing exposure and development processes on the preset photoresist 11 by using the preset mask, such that a portion of the preset photoresist corresponding to the groove is fully remained.

The light transmission region is aligned with the groove 5 during exposure of the preset photoresist 11, and after being processed by a developer, the portion of the preset photoresist 11 corresponding to the groove 5 is fully remained, while other portions of the preset photoresist are fully dissolved into the developer.

step S204: etching the electrically conductive film 10 to obtain the electrically conductive pattern 6.

The preset photoresist 11 is remained on the portion of the electrically conductive film 10 corresponding to the groove 5, thus when etching the electrically conductive film 10, the portion of the electrically conductive film 10 corresponding to the groove 5 will be fully remained, while other portions of the electrically conductive film will be etched off by an etchant. At this time, the electrically conductive pattern 6 is just filled into the whole groove 5. After finishing the etching process, a process of photoresist peeling off is implemented.

As can be seen from above contents, in this embodiment, a same one mask may be used for manufacturing the light shielding pattern 2 and for manufacturing the electrically conductive pattern 6, thereby it can effectively reduce production cost.

Further in this embodiment, the electrically conductive pattern 6 is located in the groove 5, thus the thickness of the color filter substrate will not be increased.

Optionally, after step S2, the method further comprises a step S3.

step S3: forming a groove 4' in the inner light shielding sub-pattern, and filling the groove 4' with color resist.

It is noted that in this embodiment, any existing process of manufacturing color resist may be used to form corresponding color resists R/G/B in the groove 4' in the inner light shielding sub-pattern 4, and its specific process will not be described in detail.

The color filter substrate shown in FIG. 1 or FIG. 4 may be obtained after the above step S1 to step S3.

Embodiments of the present disclosure provide a color filter substrate and a method of manufacturing the same, and a display panel, where the groove is provided in the light shielding pattern and the electrically conductive pattern is formed in the groove and electrically connected with the outer light shielding sub-pattern and/or the inner light shielding sub-pattern, thereby the problem that more electrostatic charges are accumulated on the portion of the light shielding pattern located within the display area that can be effectively solved.

It will be appreciated that the above embodiments are only exemplary embodiments for illuminating inventive concepts of the present disclosure, and the present disclosure is not limited to those. Various changes or modifications may be made by those skilled in the art without departing from the principle and spirit of the present disclosure and shall fall within the scope of the present disclosure.

What is claimed is:

1. A color filter substrate, comprising:
   a base substrate; and
   a light shielding pattern on the base substrate, the light shielding pattern being provided with a groove, which divides the light shielding pattern into an outer light shielding sub-pattern corresponding to a peripheral region of the color filter substrate and an inner light shielding sub-pattern arranged at a position corresponding to a display area of the color filter substrate;
   wherein an electrically conductive pattern is provided in at least part of a region in the groove and electrically connected with the inner light shielding sub-pattern and/or the outer light shielding sub-pattern, and
   wherein the electrically conductive pattern has an electrical resistivity less than an electrical resistivity of the light shielding pattern.

2. The color filter substrate according to claim 1, wherein the electrically conductive pattern is provided for being grounded.

3. The color filter substrate according to claim 1, wherein the electrically conductive pattern is filled into the whole groove.

4. The color filter substrate according to claim 1, wherein a side of the color filter substrate corresponding to a step region of a display panel is a first side, and the groove is in communication with the first side of the color filter substrate.

5. The color filter substrate according to claim 4, wherein at least one end of the electrically conductive pattern extends to the first side of the color filter substrate.

6. The color filter substrate according to claim 5, wherein after an array substrate and the color filter substrate are assembled into a cell, a portion of the electrically conductive pattern extending to the first side is electrically connected with a ground wiring on the array substrate by an electrically conductive adhesive.

7. The color filter substrate according to claim 1, wherein the groove has a U shape or square shape.

8. The color filter substrate according to claim 1, wherein a depth of the groove is equal to a thickness of the light shielding pattern.

9. The color filter substrate according to claim 1, wherein a width of the groove is in a range from 20 um to 50 um.

10. The color filter substrate according to claim 1, wherein a material of the light shielding pattern is a resin material.

11. The color filter substrate according to claim 1, wherein a material of the electrically conductive pattern is a metal material.

12. A display panel, comprising an array substrate and the color filter substrate according to claim 1 which are arranged opposite to each other.

13. The display panel according to claim 12, wherein the electrically conductive pattern has an electrical resistivity less than an electrical resistivity of the light shielding pattern and the electrically conductive pattern is provided for being grounded.

14. The display panel according to claim 12, wherein the groove has a U shape or square shape and the electrically conductive pattern is filled into the whole groove.

15. The display panel according to claim 12, wherein a side of the color filter substrate corresponding to a step region of the display panel is a first side, and the groove is in communication with the first side of the color filter substrate;
- at least one end of the electrically conductive pattern extends to the first side of the color filter substrate; and
- after an array substrate and the color filter substrate are assembled into a cell, a portion of the electrically conductive pattern extending to the first side is electrically connected with a ground wiring on the array substrate by an electrically conductive adhesive.

16. The display panel according to claim 12, wherein a depth of the groove is equal to a thickness of the light shielding pattern, and a width of the groove is in a range from 20 um to 50 um; and/or a material of the light shielding pattern is a resin material, and a material of the electrically conductive pattern is a metal material.

17. A method of manufacturing a color filter substrate, comprising:
- forming a light shielding pattern on a base substrate, the light shielding pattern being provided with a groove, which divides the light shielding pattern into an outer light shielding sub-pattern corresponding to a peripheral region of the color filter substrate and an inner light shielding sub-pattern arranged at a position corresponding to a display area of the color filter substrate; and
- providing an electrically conductive pattern in at least part of a region in the groove, the electrically conductive pattern being electrically connected with the inner light shielding sub-pattern and/or the outer light shielding sub-pattern, and
- wherein the electrically conductive pattern has an electrical resistivity less than an electrical resistivity of the light shielding pattern.

18. The method according to claim 17, wherein the forming the light shielding pattern on the base substrate comprises:
- forming a layer of light shielding material film on the base substrate; and
- performing exposure and development processes on the layer of light shielding material film by using a preset mask, so as to obtain the outer light shielding sub-pattern, the inner light shielding sub-pattern, and the groove between the outer light shielding sub-pattern and the inner light shielding sub-pattern.

19. The method according to claim 18, wherein the providing the electrically conductive pattern in at least part of the region in the groove comprises:
- forming an electrically conductive film on the light shielding pattern and in the groove;
- forming a preset photoresist over the electrically conductive film, one of the preset photoresist and the layer of light shielding material film is positive photoresist and the other is negative photoresist;
- performing exposure and development processes on the preset photoresist by using the preset mask, such that a portion of the preset photoresist corresponding to the groove is fully remained; and
- etching the electrically conductive film to obtain the electrically conductive pattern.

* * * * *